Aug. 12, 1924.
J. A. GUERIN
LOG CARRIER
Filed May 2, 1923
1,504,753
2 Sheets-Sheet 1
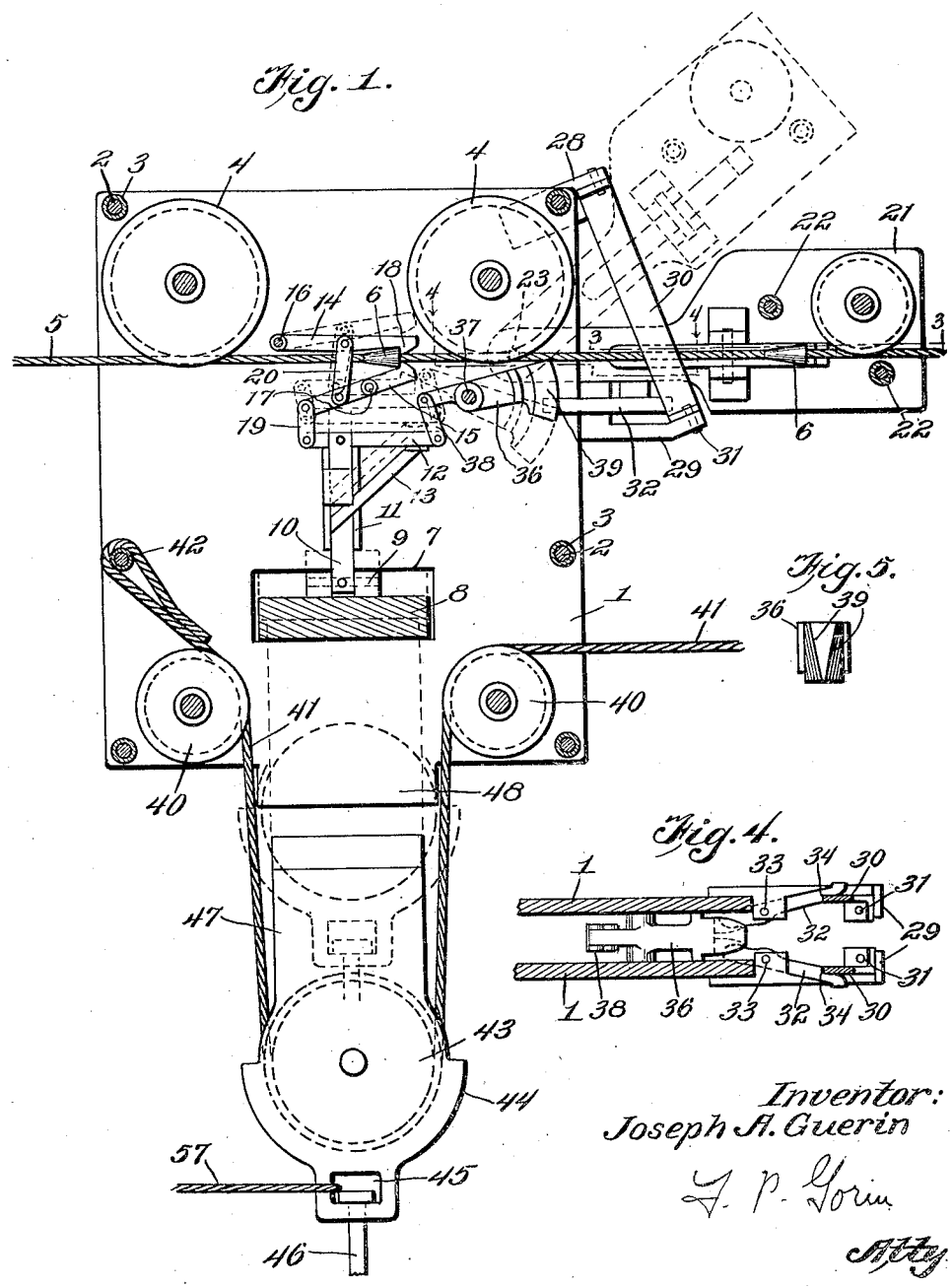

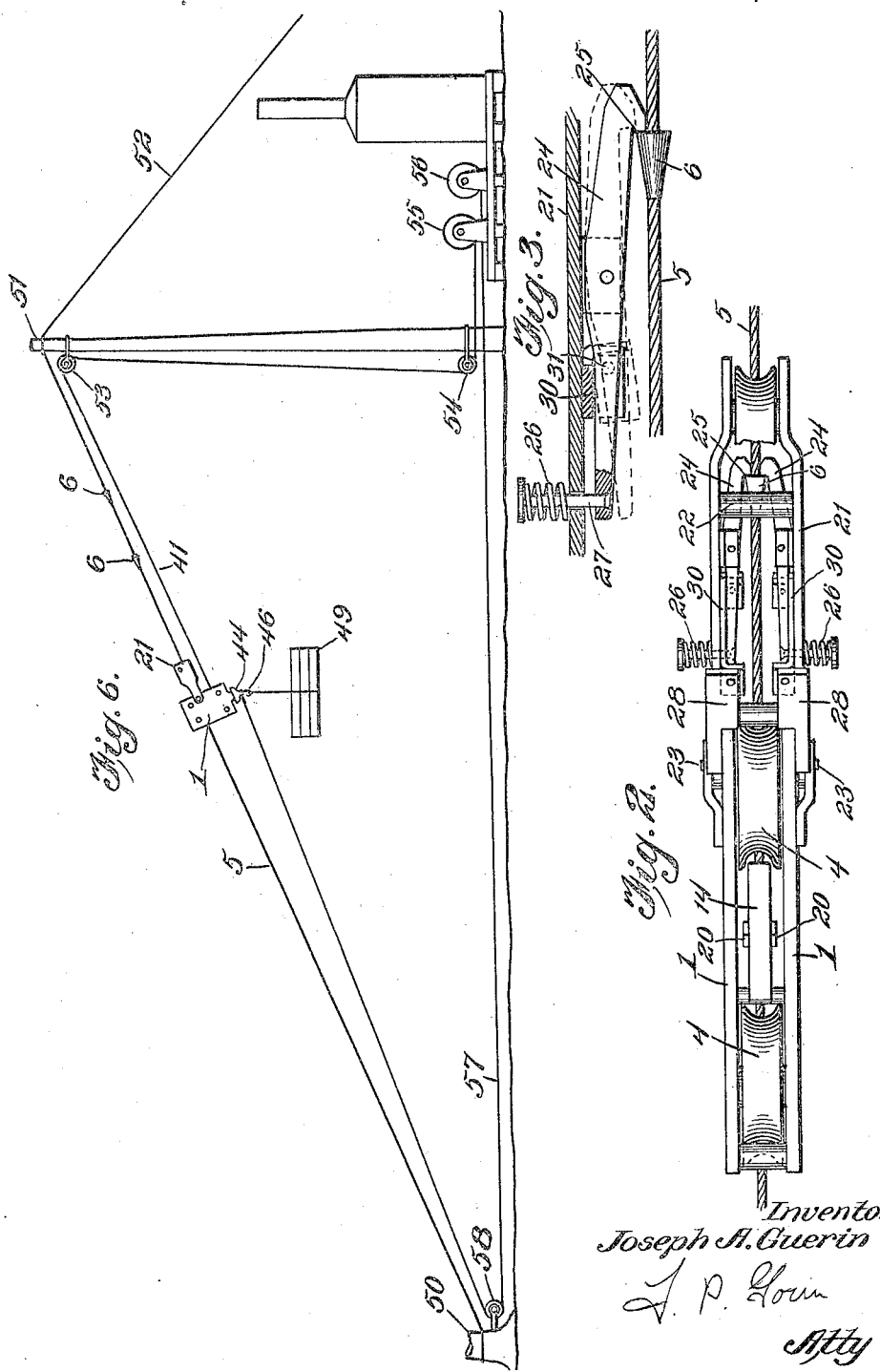

Patented Aug. 12, 1924.

1,504,753

UNITED STATES PATENT OFFICE.

JOSEPH A. GUERIN, OF SEATTLE, WASHINGTON.

LOG CARRIER.

Application filed May 2, 1923. Serial No. 636,254.

*To all whom it may concern:*

Be it known that I, JOSEPH A. GUERIN, a citizen of the United States, residing at Seattle, in the county of King and State of Washington, have invented certain new and useful Improvements in Log Carriers, of which the following is a specification.

This invention relates to an improvement in carriers of that type designed for lengthwise travel of a cable support and for automatic cooperation with stops on said support, whereby logs or the like may be moved from one position to another and delivered onto the ground surface, the carrier control providing for release of the carrier from the cable stops to permit the carrier to return or to be drawn to a new position.

The invention comprises a carrier adapted for rolling cooperation with a supporting cable and having means whereby the carrier may interlock against return movement with fixed stops on the cable. The carrier is operated lengthwise the supporting cable by a load lifting cable and the latter after the load is discharged from the carrier is drawn upon to automatically release the carrier from the stops on the supporting cable, to permit the carrier to return or be drawn to a new position for loading.

The invention is illustrated in the accompanying drawings, in which:

Fig. 1 is a view in section partly in elevation of the improved carrier.

Fig. 2 is a plan of the same.

Fig. 3 is a section on line 3—3 of Fig. 1.

Fig. 4 is a section on line 4—4 of Fig. 1.

Fig. 5 is an elevation of the forward end of the lever operating segment.

Fig. 6 is a diagrammatic view illustrating the use of the carrier.

The improved carrier comprises casing plates 1 held in spaced parallel relation by bolts 2 having spaced sleeves 3 thereon. Between the plates 1 near their upper ends are mounted in spaced relation groove rollers 4, whereby the carrier as a whole is arranged for travel on the supporting cable 5. This cable is provided at determinate points throughout its length with conical stops 6, which may be secured to the cable in any appropriate manner. The plates 1 are formed with openings 7 which align transversely of the carrier and are adapted to receive and guide a block 8, which is of less thickness than the height of the openings and thereby permitted a limited vertical movement. Secured to ears 9 rising from the block is a rod 10, guided in ways 11 outstruck from one of the plates or secured thereto. The upper end of the rod 10 is provided with a transverse bar 12, the bar 12 being held at right angles to the rod 10 by a brace 13. Levers 14 and 15 are pivotally supported at 16 and 17 between the plates 1 and above and below the plane of the supporting cable, the forward ends of these levers having terminals 18 formed to engage the enlarged ends of the stops 6 to thereby prevent movement of the carrier in one direction. One end of the bar 12 is connected by a link 19 with the lever 15 rearwardly of the pivot 17, and said lever 15 rearwardly of its pivot 17 is connected by a link 20 with the lever 14 forwardly of its pivot 16. Thus, as the block 8 is moved upwardly, it will be apparent that the stop engaging ends of the levers 14 and 15 are moved in opposite directions and thus disengaged from the stop.

An auxiliary stop gripping member is provided, comprising plates 21 held in spaced relation by cross members 22, the rear portions of these plates being reduced in width and pivotally connected to the outer surfaces of the plates 1 at 23. Pivotally mounted between the plates 21 are levers 24 formed at their forward ends with heads 25 shaped to engage the faces of the stops 6, these levers being normally held in stop engaging relation by springs 26 cooperating with pins 27 mounted in the rear ends of the levers and extending through and beyond the plates 21. It will be noted that with the carrier in operative position, the stop levers 14 and 15 operate vertically while the stop levers 24 operate horizontally, thus in cooperation with two adjacent stops, it is impossible for the carrier to be disengaged due to any swaying or movement of the supporting cable. Supported upon upper and lower brackets 28, 29, are plate-like members 30, the pivotal mountings 31 of which in the brackets are adjacent one edge of the plate to permit the free edge of said plates to have an arcuate movement. These plates are respectively positioned in rear, that is, against the outer sides of the levers 24, and are inclined downwardly and forwardly as shown, so that when the plates are swung on their pivots, they will force the rear ends of the levers inwardly and so move the head ends of said levers outwardly to release said levers from cooperation with the stop. The plates are operated by levers 32 pivotally supported at 33 on the brackets 29, the forward ends of these levers 32 being notched at 34 to receive the rear edges of the plates 30 and projected beyond said notch portions along the outer sides of the plates. Thus by outward movement of the rear ends of the levers 32, the plates are swung inwardly and the stop levers 24 forced to release position. The releasing levers 32 are operated by a segment 36 pivotally supported at 37 between the plates 1, the rearward portion of this segment being connected by a link 38 with the forward end of the bar 12. Thus as said bar is raised, the forward end of the segment is depressed. The forward end of the segment is shaped as indicated in Fig. 5, that is, provided with opposing walls 39 which incline downwardly and inwardly. The rear ends of the releasing levers 32 bear against these inclined walls 39, so that as the forward end of the segment is moved downwardly, the rear ends of the resetting levers are forced outwardly and their inner ends inwardly to thus swing the plates 30 to disengage the stop levers.

The lower portion of the casing formed by the plates 1 is provided with groove rollers 40, over which the load lifting cable 41 passes. One end of this cable is secured to a cross bar 42 between the plates 1 and passes thence over one of the rollers 40 down and around a pulley 43 mounted in a block 44 having a pendant eye 45 carrying a load suspending hook 46, and thence up and around the other grooved roller 40 of the carrier. The block 44 is provided with an extension 47, which when the block has been elevated, as hereinafter described, will pass between the plates 1 and engage and operate the block 8. If desired, the plates 1 may be extended as at 48 and the extensions flared to insure the entrance of the projection 47 of the block 44. As shown in Fig. 6, the invention in one particular use is designed to carry logs indicated at 49 to any desired point lengthwise the supporting cable 5, which may be secured at one end as to a tree stump 50 and at the opposite end to an upright as a normal tree 51, with guy ropes or cables 52 steadying the upper end of this upright 51. The lift cable 41 extends over suitable guide pulleys 53, 54, on the tree or other upright 51, to the drum 55 of the operating engine, the second drum 56 thereof carrying the haul-back cable 57 which extends over a pulley 58 on the fixture 50 and thence to the block 44. With the carrier at the lowermost position, the logs may be secured to the hook 46 and the cable 41 drawn upon to raise the logs and move the carrier lengthwise the supporting cable 5. At the desired point the stop levers 14 and 15 and 24 will engage the respective stops 6 and hold the carrier against return movement. The logs may be then lowered by releasing the cable 41, and after the logs are detached, the cable 41 is again drawn upon until the projection 47 moves into the carrier proper and elevates the block 8. In this elevation, the respective stop levers are moved to open position, as previously described, whereupon the cable 57 is operated to return the carrier to another position for additional load.

Claims:

1. A conveyor, including a supporting cable having a plurality of stops, means to engage said stops to prevent movement of the carrier in one direction on the cable, said respective means operating at right angles to each other, a load cable cooperating with the carrier to support the load, and means operated by a predetermined movement of the load cable to release the carrier relative to the stops.

2. A conveyor, including a supporting cable, provided with stops, a carrier movable lengthwise the cable, means on the carrier for engaging a plurality of stops simultaneously and at relatively right angles, and means operated remote from the carrier for simultaneously releasing said engaging means.

3. A conveyor, including a supporting cable, provided with stops, a carrier movable lengthwise the cable, means on the carrier for engaging a plurality of stops simultaneously and at relatively right angles, and means operated remote from the carrier for simultaneously releasing said engaging means, the respective engaging means cooperating with the stops in relatively different relations.

4. A conveyor, including a supporting cable, provided with stops, a carrier movable lengthwise the cable means on the carrier for engaging a plurality of stops simultaneously and at relatively right angles, and means operated remote from the carrier for simultaneously releasing said engaging means, the respective engaging means cooperating with the stops at relative right angles one to the other.

5. In an article of the class described, the combination with a line rigging, of a carrier, means for attaching a load to the carrier, means for advancing the carrier on the main line of the rigging, stops on the main line, means on the carrier to engage a plurality of stops at relatively right angles to prevent retrograde movement of the carrier, and means for releasing the last mentioned means.

6. In an article of the class described, the combination with a line rigging, of a carrier movable thereon, means for removably attaching a load to the carrier, means for moving the carrier upon the main line of the rigging, and adjustable means on the main line for arresting the carrier against retrograde movement, said means comprising separate elements operating at relatively right angles, and means for lowering the load.

7. In an article of the class described, the combination of a line rigging, including a main line, an operating line and a haul-back line, of a carrier movable upon the main line, means adjustable upon the main line for arresting the carrier against retrograde movement, said means comprising separate elements operating at relatively right angles, means on the carrier for removably securing a load thereto, means for lowering the load at a predetermined point, and means for automatically releasing the carrier.

8. In an article of the class described, the combination with a line rigging, including a main line, an operating line and a haul-back line, of a wheeled carrier movable upon the main line, cam members, means for securing the same at predetermined points on the main line, means on the carrier for removably securing a load thereto, said means being vertically adjustable by a movement of the operating line, means on the carrier for automatically engaging the said cam members at relatively right angles to arrest the carrier, and means operable by a movement of the main line for disengaging the said members.

9. In an article of the class described, the combination of a line rigging, a carrier thereon, means on the carrier for removably securing a log to the carrier, cams upon the main line, and means for engaging the cams at predetermined points and at relatively right angles to arrest the carrier.

10. In an article of the class described, the combination of a line rigging, a wheeled carrier thereon, means on the carrier for removably securing a log to the carrier, cams upon the main line, and means for engaging the cams at predetermined points and at relatively right angles to arrest the carrier.

11. In an article of the class described, the combination with a line rigging including a main line, an operating line and a haul-back line, of a carrier, cam members, means for adjustably securing the same to the main line, the operating line having a loop thereon, a tackle block within the loop, and means on the loop for removably securing the log, latch arms upon the carrier for automatically engaging the cam members upon the main line, said latch arms being arranged in pairs operating at right angles to each other and means for disengaging the latch arms, including a plunger and a head block.

12. In an article of the class described, the combination with a line rigging, including a main line, an operating line and a haul-back line, of a carrier, cam members, means for adjustably securing the same to the main line, the operating line having a loop thereon, a tackle block within the loop, and means on the loop for removably securing the log, latch arms upon the carrier for automatically engaging the cam members upon the main line, said latch arms being arranged in pairs operating at right angles to each other and means for disengaging the latch arms, including a plunger, a head block and a plurality of links.

13. In an article of the class described, the combination with a line rigging, including a main line, an operating line and a haul-back line, of a carrier, cam members, means for adjustably securing the same to the main line, the operating line having a loop thereon, a tackle block within the loop, and means on the loop for removably securing the log, latch arms upon the carrier for automatically engaging the cam members upon the main line, said latch arms being arranged in pairs operating at right angles to each other and means for disengaging the latch arms, including a plunger, a head block, a plurality of links and a sector.

14. In an article of the class described, the combination with a line rigging, including a main line, an operating line and a haul-back line, of a carrier, cam members, means for adjustably securing the same to the main line, the operating line having a loop thereon, a tackle block within the loop, and means on the loop for removably securing the log, latch arms upon the carrier for automatically engaging the cam members upon the main line, said latch arms being arranged in pairs operating at right angles to each other and means for disengaging the latch arms, including a plunger, a head block, a system of links and a coacting sector.

15. In an article of the class described, the combination with a line rigging, including a main line, an operating line and a haul-back line, of a carrier, cam members, means for adjustably securing the same to the main line, the operating line having a loop thereon, a tackle block within the loop, and means on the loop for removably securing the log, latch arms upon the carrier for automatically engaging the cam members upon the main line, said latch arms being arranged in pairs operating at right angles to each other and means for disengaging the latch arms, including a plunger, a head block, a system of links, a coacting sector and a pair of plates.

16. In an article of the class described, the combination with a line rigging, including a main line, an operating line and a haul-back line, of a carrier, cam members, means for adjustably securing the same to the main line, the operating line having a loop thereon, a tackle block within the loop, and means on the loop for removably securing the log, latch arms upon the carrier for automatically engaging the cam members upon the main line, said latch arms being arranged in pairs operating at right angles to each other and means for disengaging the latch arms, including a plunger, a head block, a system of links, a coacting sector and a pair of eccentrically mounted plates.

In testimony whereof I affix my signature.

JOSEPH A. GUERIN.